(12) United States Patent
Jeschke et al.

(10) Patent No.: US 7,454,351 B2
(45) Date of Patent: Nov. 18, 2008

(54) SPEECH DIALOGUE SYSTEM FOR DIALOGUE INTERRUPTION AND CONTINUATION CONTROL

(75) Inventors: Baerbel Jeschke, Ulm (DE); Frank Reh, Schwieberdingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 587 days.

(21) Appl. No.: 11/044,815

(22) Filed: Jan. 26, 2005

(65) Prior Publication Data

US 2005/0267759 A1   Dec. 1, 2005

(30) Foreign Application Priority Data

Jan. 29, 2004 (EP) .................... 04001949

(51) Int. Cl.
*G10L 15/22* (2006.01)
(52) U.S. Cl. .................................................. 704/275
(58) Field of Classification Search ............... 704/275
See application file for complete search history.

(56) References Cited

U.S. PATENT DOCUMENTS

| | | | |
|---|---|---|---|
| 4,625,081 A * | 11/1986 | Lotito et al. ............. | 379/88.26 |
| 4,827,520 A | 5/1989 | Zeinstra | |
| 5,671,329 A * | 9/1997 | Hatazaki ................. | 704/253 |
| 6,012,030 A | 1/2000 | French-St. George et al. | |
| 6,041,300 A | 3/2000 | Ittycheriah et al. | |
| 6,073,013 A | 6/2000 | Agre et al. | |
| 6,073,101 A | 6/2000 | Maes | |
| 6,088,671 A | 7/2000 | Gould et al. | |
| 6,138,098 A | 10/2000 | Shieber et al. | |
| 6,169,789 B1 | 1/2001 | Rao et al. | |
| 6,173,266 B1 | 1/2001 | Marx et al. | |
| 6,208,932 B1 | 3/2001 | Ohmura et al. | |
| 6,236,968 B1 | 5/2001 | Kanevsky et al. | |

(Continued)

FOREIGN PATENT DOCUMENTS

EP   0 911 808 A1   4/1999

(Continued)

OTHER PUBLICATIONS

European Search Report, Application No. EP 04 00 1949, Dated on Jul. 27, 2004, 2 pages.

(Continued)

*Primary Examiner*—Susan McFadden
(74) *Attorney, Agent, or Firm*—Brinks Hofer Gilson & Lione (57) ABSTRACT

A speech dialogue system (SDS) is provided for carrying out a speech dialogue with a user to control an electronic device. The SDS includes a speech dialogue interruption unit for interrupting the speech dialogue and a speech dialogue continuation unit for continuing the interrupted speech dialogue. The system provides a method of conducting the speech dialogue between the speech dialogue system and a user. The method provides the steps of interrupting the speech dialogue upon receipt of a predetermined pause command from the user or from an electronic device. The method continues the speech dialogue with the speech dialogue system when the user or the electronic device provides a predetermined continuation command to the SDS. The method further allows the canceling of the speech dialogue when the user provides a predetermined cancellation command to the SDS.

48 Claims, 4 Drawing Sheets

U.S. PATENT DOCUMENTS

| | | | |
|---|---|---|---|
| 6,246,981 B1 | 6/2001 | Papineni et al. | |
| 6,345,254 B1 | 2/2002 | Lewis et al. | |
| 6,393,403 B1 | 5/2002 | Majaniemi | |
| 6,396,481 B1 | 5/2002 | Challa et al. | |
| 6,411,934 B1 | 6/2002 | Moller et al. | |
| 6,422,522 B1 | 7/2002 | Woollen | |
| 6,453,020 B1 | 9/2002 | Hughes et al. | |
| 6,496,799 B1 | 12/2002 | Pickering | |
| 6,499,015 B2 | 12/2002 | Brooks et al. | |
| 6,505,155 B1 | 1/2003 | Vanbuskirk et al. | |
| 6,594,630 B1 | 7/2003 | Zlokarnik et al. | |
| 6,598,020 B1 | 7/2003 | Kleindienst et al. | |
| 6,601,029 B1 | 7/2003 | Pickering | |
| 6,654,720 B1 | 11/2003 | Graham et al. | |
| 6,658,388 B1 | 12/2003 | Kleindienst et al. | |
| 6,658,466 B1 * | 12/2003 | Ellestad et al. | 709/224 |
| 6,704,396 B2 | 3/2004 | Parolkar et al. | |
| 6,721,633 B2 | 4/2004 | Funk et al. | |
| 6,741,963 B1 | 5/2004 | Badt et al. | |
| 6,748,361 B1 | 6/2004 | Comerford et al. | |
| 6,785,651 B1 | 8/2004 | Wang | |
| 6,801,897 B2 | 10/2004 | Kist et al. | |
| 6,832,196 B2 | 12/2004 | Reich | |
| 6,839,670 B1 * | 1/2005 | Stammler et al. | 704/251 |
| 6,895,242 B2 | 5/2005 | Fu et al. | |
| 6,907,119 B2 | 6/2005 | Case et al. | |
| 6,922,200 B1 | 7/2005 | Marques | |
| 6,925,495 B2 | 8/2005 | Hegde et al. | |
| 6,931,446 B1 | 8/2005 | Cox et al. | |
| 6,950,793 B2 | 9/2005 | Ross et al. | |
| 6,985,850 B1 | 1/2006 | Scanlan | |
| 6,996,426 B2 | 2/2006 | Granberg | |
| 7,085,723 B2 | 8/2006 | Ross et al. | |
| 7,099,829 B2 | 8/2006 | Gomez | |
| 7,127,402 B2 | 10/2006 | Ross et al. | |
| 7,146,323 B2 | 12/2006 | Guenther et al. | |
| 7,165,027 B2 | 1/2007 | Kellner et al. | |
| 7,171,365 B2 | 1/2007 | Cooper et al. | |
| 7,174,298 B2 | 2/2007 | Sharma | |
| 7,197,331 B2 | 3/2007 | Anastasakos et al. | |
| 7,254,539 B2 | 8/2007 | Carberry et al. | |
| 7,257,537 B2 | 8/2007 | Ross et al. | |
| 2002/0067839 A1 | 6/2002 | Heinrich | |
| 2002/0198699 A1 | 12/2002 | Greene et al. | |
| 2003/0004725 A1 | 1/2003 | Agapi et al. | |
| 2003/0005159 A1 | 1/2003 | Kumhyr | |
| 2003/0040899 A1 | 2/2003 | Ogilvie | |
| 2003/0191646 A1 | 10/2003 | D'Avello et al. | |
| 2004/0078762 A1 | 4/2004 | Lee et al. | |
| 2004/0167770 A1 | 8/2004 | Zhuo et al. | |
| 2004/0194099 A1 | 9/2004 | Lamping et al. | |
| 2004/0198326 A1 | 10/2004 | Hirani | |
| 2004/0243419 A1 | 12/2004 | Wang | |
| 2004/0249638 A1 | 12/2004 | Wang | |
| 2004/0264672 A1 | 12/2004 | Paek et al. | |
| 2006/0079332 A1 | 4/2006 | Bishop | |

FOREIGN PATENT DOCUMENTS

| | | |
|---|---|---|
| EP | 1 054 390 A2 | 5/2000 |
| EP | 1 063 636 A2 | 12/2000 |
| EP | 1 231 798 A2 | 8/2002 |
| EP | 1 524 778 A1 | 4/2005 |
| FR | 2 808 915 A1 | 11/2001 |
| GB | 2 343 779 A | 5/2000 |
| GB | 2 372 864 A | 9/2002 |
| WO | WO 99-57648 A1 | 11/1999 |
| WO | WO 00-52921 A2 | 9/2000 |
| WO | WO 01-41490 A1 | 6/2001 |
| WO | WO 02-05264 A1 | 1/2002 |
| WO | WO 02-087098 A1 | 10/2002 |

OTHER PUBLICATIONS

H. Maes, Stephane et al. Editors, W3C "Multimodal Interaction Requirements", XP-002271304, obtained from the internet at, http://www.w3.org/TR/2003/NOTE-mmi-reqs-20030108 on Feb. 24, 2004, pp. 1-37.

Hickey, Marianne, Editor, W3C "Multimodal Requirements for Voice Markup Languages", XP-002271602, obtained from the internet at, http://www.w3.org/TR/2000/WD-multimodal-reqs-20000710 on Feb. 26, 2004, pp. 1-17.

Kuhn et al., "Learning Speech Semantics with Keyword Classification Trees," CRIM, School of Computer Science, McGill University, Montreal, Quebec, Canada H3A 2A7, Apr. 1993, pp. 1155-1158.

McGlashan, Scott et al., Editors, W3C "Voice Extensible Markup Language (VoiceXML) Version 2.0", XP-002248286, obtained from the internet at, http://www.w3.org/TR/voicexml on Jul. 18, 2003, pp. 1-80.

McGlashan, Scott et al., Editors, W3C "Voice Extensible Markup Language (VoiceXML) Version 2.0", XP-002248286, obtained from the internet at, http://www.w3.org/TR/voicexml on Jul. 18, 2003, pp. 81-161.

Rudnicky et al., "Spoken Language Recognition in an Office Management Domain," ICASSP 91, vol. 2, 1991 International Conference on Acoustics, Speech, and Signal Processing, May 14-17, 1991, pp. 829-832.

S P A Ringland et al. "Multimodality—the future of the wireless user interface", XP-001171240, BT Technology Journal, vol. 21, No. 3, Jul. 2003, pp. 181-191.

* cited by examiner

SPEECH DIALOGUE SYSTEM FOR DIALOGUE INTERRUPTION AND CONTINUATION CONTROL

PRIORITY CLAIM

This application claims the benefit under 35 U.S.C. § 119 (a)-(d) to European Patent Application No. 04001949.9 filed on Jan. 29, 2004. The disclosure of the above application is incorporated herein by reference in its entirety.

BACKGROUND OF THE INVENTION

1. Technical Field

This application relates to a system for carrying out a speech dialogue between a speech dialogue system and a user, and in particular, a system for carrying out a speech dialogue between a speech dialogue system and a user where the user uses the speech dialogue with the speech dialogue system to control an electronic device. The system furthers provides a method for carrying out a speech dialogue between a speech dialogue system and a user.

2. Related Art

Speech dialogue systems ("SDS") represent voice interfaces between a human user and a machine or electronic device, whereby the user can control the machine by giving speech commands to the SDS. The SDS analyzes the speech commands and filters out control commands that in turn are transmitted to the machine or the electronic device. A speech dialogue carried out between the SDS and a user may include the steps of transmitting a request for an acoustic or voice input by the SDS, waiting for a speech input from the user, and receiving a speech input from the user. To carry out a full speech dialogue, these steps may be repeated as necessary to provide the information for controlling the machine or electronic device. In one example, an SDS may be located in a car where the SDS offers the user the possibility to control at least some of the electronic devices in the vehicle without the driver diverting his or her attention from traffic. Such devices may include the vehicle's radio, its navigation system, or its climate control system.

The method for communicating with an SDS may begin with the user orally requesting a speech dialogue. Following the request, the SDS may prompt the user and wait for an input. If the user delays replying to the SDS, because the user is otherwise occupied with traffic, then the SDS may shut down the dialogue after a predetermined delay. Where the user has already communicated some information, the information may be lost and the user will have to start the application over from the beginning. Therefore, a need exists for a system that preserves the previously communicated instructions and resumes the dialogue without starting from the beginning.

SUMMARY

This application provides a speech dialogue system ("SDS") that carries out a speech dialogue between the SDS and a user where the SDS controls an electronic device with the voice commands received from the user. The system provides a method for carrying out a speech dialogue between the SDS and a user where the SDS controls an electronic device with the voice commands received from the user. The system may include a speech dialogue interrupting unit that interrupts an ongoing speech dialogue between a user and the system. The system also may include a speech dialogue continuing unit for continuing the interrupted speech dialogue at a point where the speech dialogue was interrupted. The system also may include a cancellation unit for canceling the interrupted speech dialogue upon the user's request. The system may be configured for receiving the commands for interrupting and continuing the speech dialogue by receiving the pause and continue commands through a microphone or by the use of control keys.

The system further provides a method that may include the steps of interrupting the speech dialogue upon receipt of a predetermined pause command by the SDS and continuing the speech dialogue upon receipt of a predetermined continuation command. The method may provide a step for canceling the speech dialogue upon receipt of a predetermined cancellation command by the SDS. The cancellation command may be a speech command or the command may be transmitted by the user activating a control key or switch.

The method may include a step where an electronic device issues a pause or interruption command. When the electronic device is finished with an operation that requires the interruption, the electronic device may issue a continuation command to resume the speech dialogue. Thus, the speech dialogue will proceed from the point where the speech dialogue was interrupted. For example, an electronic device that issues an interruption command may include a telephone that interrupts the speech dialogue when an incoming call is received.

The system may be configured to continue an interrupted speech dialogue when the user repeats part of the speech dialogue or repeats the last step. The system may include a memory unit that stores the previously received commands from the user. The method may provide the opportunity to request and conduct a second speech dialogue that controls a second electronic device. Upon completion of the second speech dialogue, the user may continue with the first dialogue at the point where the user previously interrupted the speech dialogue without having to start at the beginning. The memory allows the system to retain or store the previous instructions or commands. Further, the system may provide the flexibility to repeat the speech dialogue by repeating the last step of the previously interrupted speech dialogue and continuing the speech dialogue at that point.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

This application provides a Speech Dialogue System (SDS) that may interrupt an ongoing speech dialogue between a user and the SDS when the user becomes otherwise distracted with another task and permit resumption of the speech dialogue at the point where the dialogue was interrupted at a later time. The SDS may interface with an electronic device or machine converting the voice or speech instructions to commands for controlling the electronic device or machine. The SDS may interface with more than one electronic device or machine such as those found in a vehicle.

Figure 1:
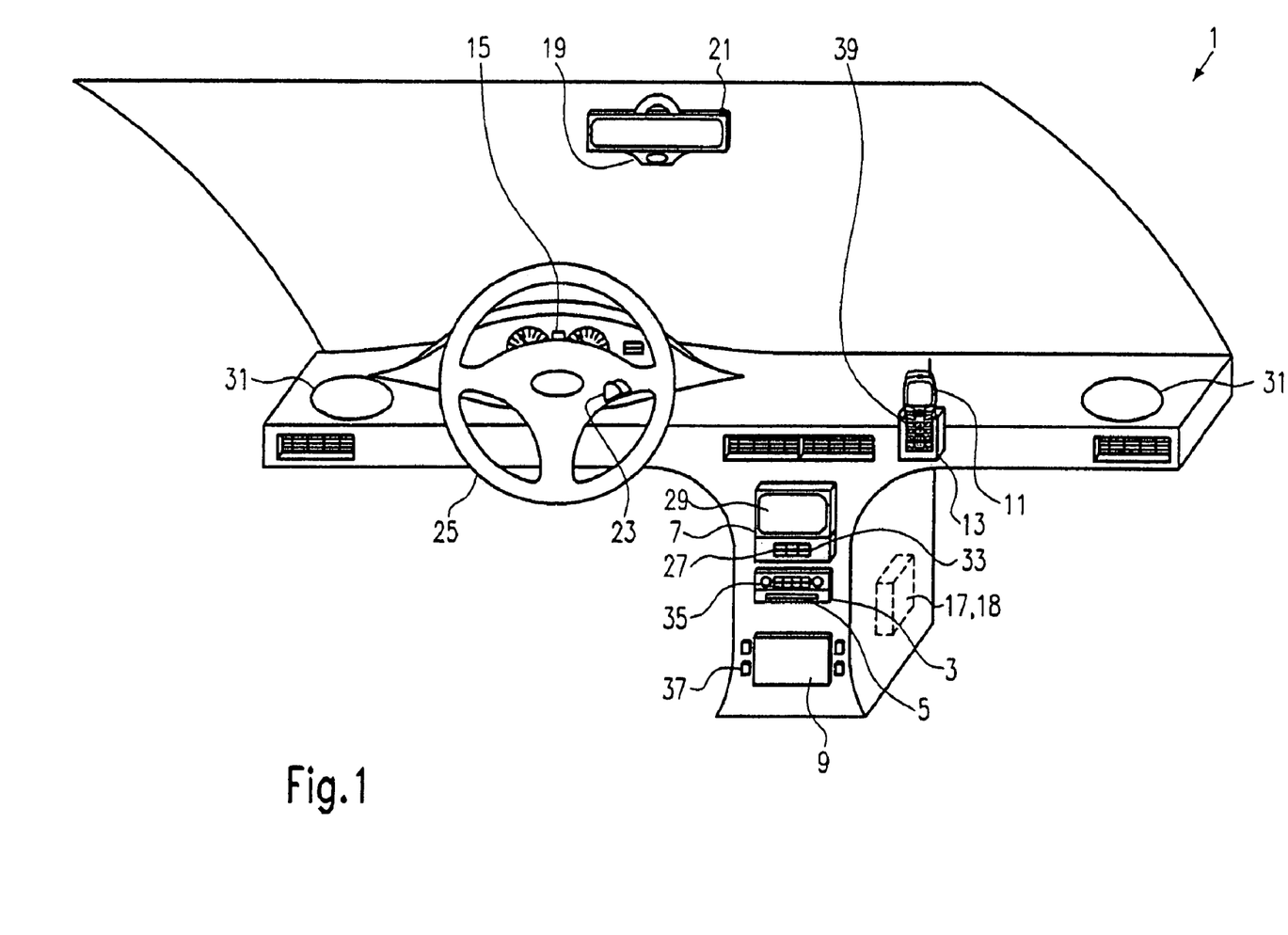
FIG. 1 shows an example of a dashboard of a vehicle with typical electronic devices.

FIG. 1 shows an interior of a vehicle that includes an information and entertainment system 1. The information and entertainment system may include several electronic devices such as a radio device 3 that may include a compact disk (CD) player 5, digital versatile disk (DVD) player 9 and compact cassette (CC) player (not shown). The vehicle also may include a navigation system 7 and a climate control system (not shown). A telephone may be included where the telephone is fixed to the vehicle (not shown), or as a mobile telephone 11 held by a mobile telephone holder 13. An on-board computer 15, a super audio compact disk player (not shown), and an MPEG audio device (not shown) also may be included. Other devices, such as a television, an internet connecting device, or a computer game console may be a part of the information and entertainment system for the vehicle. Such an SDS 18 may be implemented in a household system as well.

The information and entertainment system 1 may include a head unit 17 which includes the SDS 18. The head unit 17 connects to the electronic devices and may transmit control commands to the devices. The head unit 17 also may receive commands from those electronic devices. The SDS 18 includes an input means such as a microphone 19. The microphone may be provided at different locations or at several different locations throughout the vehicle. For example, the microphone 19 may be located in the vicinity of each passenger location. As shown in FIG. 1, the microphone 18 which may be arranged in the rear view mirror 21.

The SDS 18 may include control keys 23 which may be located on the steering wheel 25 and control keys 27 located on the multimedia screen 29. The multimedia screen 29 may be part of the information and entertainment system 17 and the screen 29 may serve as an output or output means for the SDS 18. The multimedia screen 29 also may be an output for the electronic device that is being controlled. Another output means may include loudspeakers 31 for the electronic devices and SDS 18. The electronic devices may be controlled by control keys 33, 35, 37 and 39 that control the navigation system 7, the radio 3 and CD player device 5, the climate control system 9, and the mobile telephone or telephone 11, respectively.

The SDS may conduct a speech dialogue with a user for controlling the electronic device 50 or devices. The SDS may be configured to interrupt a speech dialogue at any time with an audible command or by activating a pause key. The speech may be continued by an audible command or by the activation of a continuation key.

The information and entertainment system 1 may include a head unit 17 which includes the SDS 18. The head unit 17 connects to the electronic devices and may transmit control commands to the devices. The head unit 17 also may receive commands from those electronic devices. The SDS 18 includes an input means such as a microphone 19. The microphone may be provided at different locations or at several different locations throughout the vehicle. For example, the microphone 19 may be located in the vicinity of each passenger location. As shown in FIG. 1, the microphone 19 which may be arranged in the rear view mirror 21.

Figure 2:
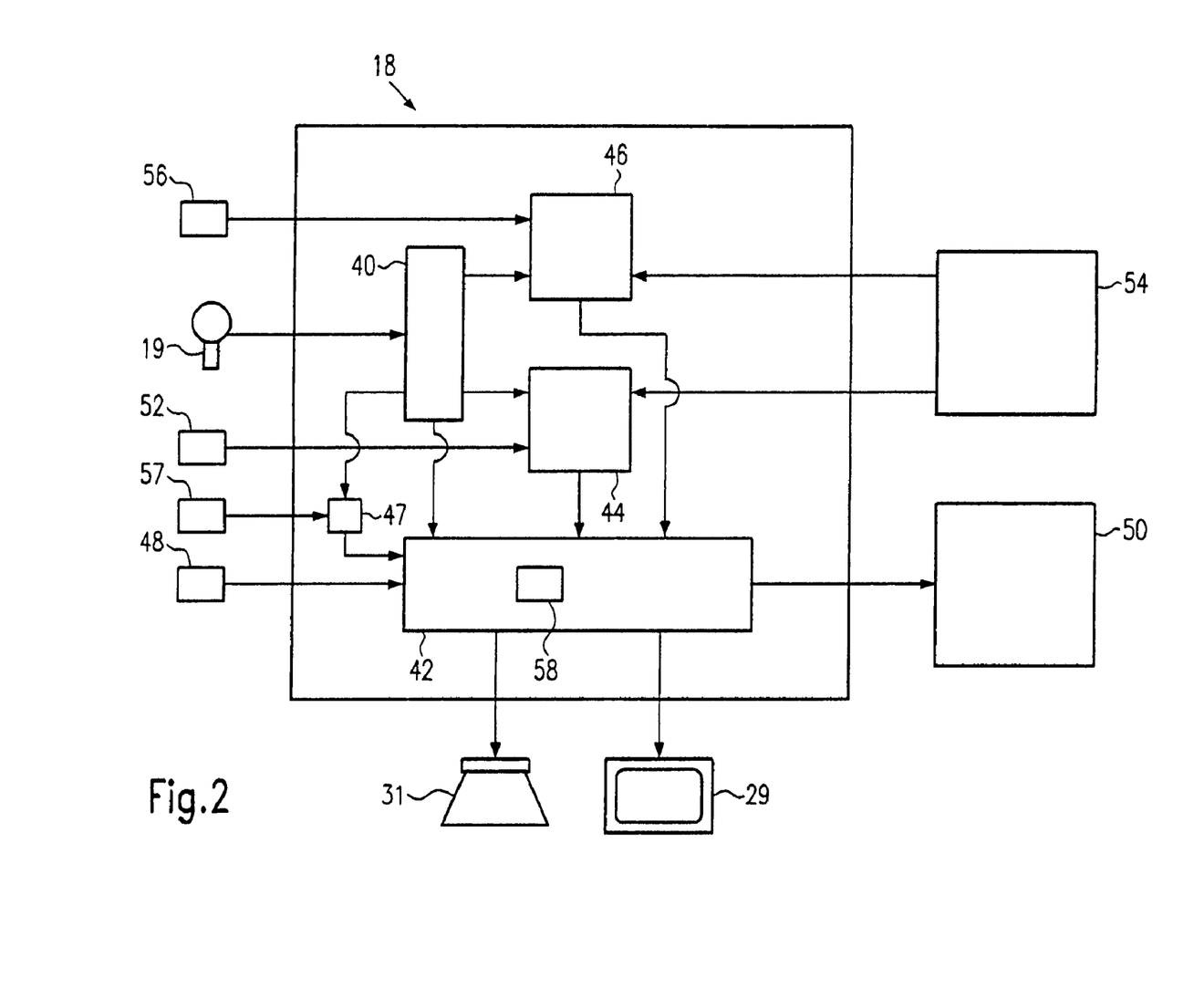
FIG. 2 is an exemplary block diagram of a speech dialogue system.

The speech analyzing unit 40 may be connected to a microphone 18 and to the speech dialogue unit 42. The speech analyzing unit 40 also may be connected to the interruption unit 44 and to the continuation unit 46. The speech dialogue unit 42 may be connected to the interruption unit 44, the continuation unit 46, and the cancellation unit 47. The speech dialogue unit may have a push to talk ("PTT") lever 48 which serves to switch the SDS 18 on or off. The speech dialogue unit also may connect to an output means 29 and 31 and electronic devices 50 and 54. The speech dialogue unit 42 may include a memory unit 58 for storing the interrupted speech dialogue. The memory unit 58 may be a semiconductor memory, magnetic storage unit or even an optical storage unit. The output means of the SDS 18 may include a speaker 31 and a multimedia screen 29. An interruption control key 52 may connect to the interruption unit 44. A continuation control key 56 may connect to the continuation unit 46. A cancellation control key or switch may connect to the cancellation unit 47.

In the example of FIG. 2, the speech analyzing unit 40 analyzes the sound data received by the microphone 19. The analyzing unit 40 may remove background noise and filter out and separate the speech inputs. The speech dialogue unit 42 may receive speech inputs from the speech analyzing unit 40. The speech inputs may be analyzed and identified as control commands. The control commands may be transmitted to the electronic device 50, directly from the SDS 18 or via the head unit 17 (not shown in FIG. 2). Prompts or requests from the SDS 18 for speech input from the user may be output by the speech dialogue unit 42 to the user through the loudspeaker 31 or the multimedia screen 29. The loudspeakers may be the audio speakers in a car that are connected to a sound system that includes the radio 3 and CD player 5.

The speech dialogue interruption unit 44 may connect to the speech analyzing unit 40, a pause control key 52, and an electronic device 54. The interruption unit 44 may be a controller or other logical circuit unit that issues an interrupt when a pause command is recognized by the speech analyzing unit 40, when a signal is received from the pause control key 52, or when an interrupt is received from the electronic device 54. The interruption unit 44 may transmit a pause or interrupt signal interrupting the speech dialogue unit 42 which interrupts the speech dialogue. Thus, the speech dialogue can be interrupted by the user or by another electronic device such as a telephone 11. For example, an incoming call to a telephone 11 may cause the telephone 11 to issue a pause command to interrupt the speech dialogue and possibly an ongoing operation of the entertainment system 1. When the telephone 11 pauses the interruption unit 44, the interruption unit 44 signals the speech dialogue unit 42 with an interruption signal. The speech dialogue unit 42 may then pause until further instructions are received from the user or the telephone 11.

When the speech dialogue unit 42 is interrupted, the speech dialogue unit 42 may be configured to identify the electronic device 50 for which the speech dialogue was interrupted. The identification of the electronic device 50 may be displayed on the multimedia screen 29. Further, the multimedia screen 29 may display the received speech dialogue from the user so that the user may resume at the point where the speech dialogue was interrupted. By looking at the multimedia screen 29 the user can continue at that point. If more than one speech dialogue was interrupted, the display may indicate each electronic device 50 and the point where each speech dialogue was interrupted. The user may select the electronic device 50 and 54 from the multimedia screen 29 to continue the corresponding speech dialogue.

The speech dialogue continuation unit 46 may be connected to the speech analyzing unit 40, a continuation control key 56, and an electronic device 50 or devices. The continuation unit 46 may be a logic circuit or controller that issues a continuation signal to the speech dialogue unit 42, alerting the speech dialogue unit 42 to resume and continue with the speech dialogue that was interrupted. The continuation unit 42 may be configured to receive an audible continue command from the user. Alternatively, the user may activate the continuation control key 56 to continue the speech dialogue. Further, an electronic device 54 may request a continuation of the speech dialogue. A telephone call may have initially interrupted the speech dialogue and upon completion of the telephone call, the telephone 11 sends the continuation command to the continuation unit 46. The continue signal from the continuation unit 46 allows the speech dialogue unit 42 to continue with the speech dialogue from the point where the dialogue was paused.

The interrupted speech dialogue cancellation unit 47 may be connected to a cancel control key 57 or switch and the speech analyzing unit 40. The cancellation unit 47 may transmit a cancellation signal to the speech dialogue unit 42 canceling the interrupted dialogue. The cancellation command may cancel a chosen speech dialogue at any time. The cancellation command may originate with the user, either audibly or by activating the cancellation control key 57. This command gives the user an option to discontinue the speech dialogue. The cancellation signal from the cancellation unit 47 may reset the speech dialogue unit 42.

A single control key may incorporate the functions of the pause control key 52 and the continuation control key 56. Where one control key is provided, the key may be configured so that upon a first activation the speech dialogue is interrupted and upon a second activation the interrupted speech dialogue is continued. In another example, the control key may be a "push to talk" (PTT) lever, used to switch the SDS 18 on and off. The PTT lever also may be configured as an interruption and continuation key. Depending on the way the PTT lever is activated, either the SDS 18 is turned off or the dialogue is simply interrupted and continued. For example, if the PTT lever is held for a relatively long period of time, the SDS 18 may be turned off On the other hand, when the PTT lever is held for a short time period, it is a signal to interrupt and pause the dialog or continue the dialogue if the dialogue was already paused.

A single control key also may incorporate the functions of the four control keys 48, 52, 56 and 57 shown in FIG. 2. The operation of one control key may depend on the way the key is activated. Either an ON/OFF function, the pause/continue function, or the cancellation may be carried out by the control. In addition to the control keys 48, 52, 56 and 57 in FIG. 2, control keys from the electronic devices 3, 5, 7, 9, 11, 13, and 15 shown in FIG. 1 may fulfill the role of the pause control key and the continuation control key. For example, the pause key for the CD player 5 may be utilized as a pause and continuation control key for the speech dialogue. Further, the control keys may be located in the steering wheel providing easy access for the driver.

As shown in FIG. 2, the SDS 18 is controlling only one electronic device 46. However in combination with FIG. 1, it is understood that the SDS 18 can be used to control more than one electronic device (in combination with the head unit 17) and more than one electronic device 50 may provide pause and continuation commands. The interruption unit 44 and the continuation unit 46 may be configured in conjunction with the speech dialogue unit to interrupt any of the various electronic devices 50. The user may interrupt a speech dialogue with one electronic device 50 and begin a dialogue with a second or third device. An electronic device 54 may also interrupt an on-going speech dialogue with another device 50. As mentioned previously, the electronic device 54 might be a telephone 11 that interrupts a speech dialogue with the electronic device 50 upon receiving an incoming phone call.

The SDS 18 also may be configured to allow a particular electronic device 50 to either interrupt or continue operating even if a speech dialogue is interrupted. For instance, where an incoming phone call is present, the user may configure the radio 3 to continue playing. Also, the user may configure the system to mute or interrupt the radio 3 or another entertainment device at the time of an incoming phone call.

The SDS 18 may be configured to interrupt the speech dialogue when a pause command is received by the interruption unit 44 from an electronic device 54. When the continuation unit 46 receives a continuation command from the electronic device 54 the speech dialogue is continued. By way of example, the user could conduct a speech dialogue to control and input a new target address into the navigation system 7. During this speech dialogue, the telephone 11 receives an incoming call and provides an interruption command to the interruption unit 44 to interrupt the speech dialogue, informing the user about the incoming telephone call. Once the telephone call is finished the telephone 11 may then provide the continuation command to the continuation unit 46 so that the interrupted speech dialogue can be continued. In this example, the user may finish the speech dialogue with the navigation system 7 by inputting the remainder of the instructions.

In another example, if an electronic device 50 is already operating and the user is performing a speech dialogue to change the operation of that electronic device 50, and for some reason, the user needs to interrupt the speech dialogue, or another electronic device 54 should interrupt the dialogue, the device 50 may continue to operate. For instance, the CD player 5 is playing a CD. The user would like to select another CD for the CD player 5 to play. The user begins the speech dialogue but interrupts the speech dialogue before informing the CD player 5 which CD to select. The CD player 5 may continue playing the current CD.

In a variant of the above example of exchanging one CD with another CD, the user decides to interrupt the dialogue after instructing the SDS 18 that he wants to switch CDs. However, before the user identifies the new CD, the interruption occurs. The SDS 18 may continue the operation and provide a control command to the CD player 5 to remove the current CD from the player and place it in the magazine and wait for the command associated with the new CD. Once the user decides to continue with the speech dialogue and instructs the system to play the desired CD, the waiting time for the selection of the new CD is reduced in comparison to a system without the interruption and continue feature.

In a further example, a computer system 15, a navigation system 7, or an MP3 player (not shown) may download information during the interruption of the speech dialogue. The electronic device 50 associated with the speech dialogue can continue downloading the information from a remote location during the interruption of the speech dialogue, reducing the download time for the user. When the speech dialogue continues the information may be readily available in the device when needed.

For example, during the interruption of the speech dialogue, the SDS 18 may transmit control commands to the electronic device so that the electronic device 50 continues operating when no further instructions are necessary. The user may input a new target location into the navigation system 7 to obtain navigation information. However, the speech dialogue is interrupted after the user announces the destination city but does not announce the street information. The navigation system 7 may calculate the best route to the city during the speech dialogue interruption with the navigation system 7 anyway. The navigation system 7 may be configured to download corresponding maps that depend on the current location of the user and the user's final destination from a remote server. From that information only, the server may be able to determine the location of the final destination and present the user with the results without further commands from the user.

The SDS 18 may be configured so that a second speech dialogue is performed while a first speech dialogue is interrupted. The second speech dialogue may control a different electronic device. In the previous example, where the inputting of a new target location into the navigation system 7 is interrupted by an incoming telephone call, the user during the telephone conversation may store a new address or telephone number into his telephone 11. This feature allows the storage of the new address or telephone number via the SDS 18, even while the first speech dialogue with another electronic device 50, such as the navigation system 7 is interrupted.

The multimedia screen 29 for the SDS 18 may include a touch screen (not shown). When the SDS 18 is configured, the touch screen for the multimedia screen 29 may be used to interrupt and continue the speech dialogue with any of the electronic devices 50 for which the SDS 18 controls. The SDS 18 may be configured for displaying the identification of an interrupted speech dialogue and the electronic device 50 for which the interruption corresponds. In addition, the SDS 18 may be configured so that touching the appropriate portion of the touch screen 29 may include a command to cancel the interrupted speech dialogue. At least three roles may be fulfilled with such a touch screen. For example, one role may inform the user about the status of the ongoing speech dialogues with any of the associated electronic devices 50. Another role may give the user the possibility to interrupt, continue or cancel any of the possible interrupted speech dialogues for the associated electronic devices 50. Further, the touch screen may also be a display for the electronic devices 50, such as the navigation system 7, the DVD player or even the on-board computer 15.

The SDS 18 may include a third control key (not shown) that is configured such that each interrupted speech dialogue is attributed to a different third control key. Upon activation of a second control key, the corresponding speech dialogue may be continued. In combination with the multimedia screen 29 showing all of the interrupted and ongoing speech dialogues, the third control key may provide an easy way for the user to continue with the desired speech dialogue.

A memory unit 58 or a storage means, such as a solid state memory, may be provided for storing the speech inputs from the user. The continuation unit 46 can be configured to replay part of the interrupted speech dialogue for the user so the user knows where the speech dialogue was interrupted. Upon continuing, the user will be able to realize where the speech dialogue was interrupted. The memory unit 58 may provide storage for several ongoing speech dialogues with one or more electronic devices 50. The user will have the flexibility of multi-tasking with several electronic devices at one time. This will be especially advantageous if the user is trying to operate a CD player 5 and the navigation system 7 at the same time and receives a phone call in the middle of a speech dialogue.

Figure 3:
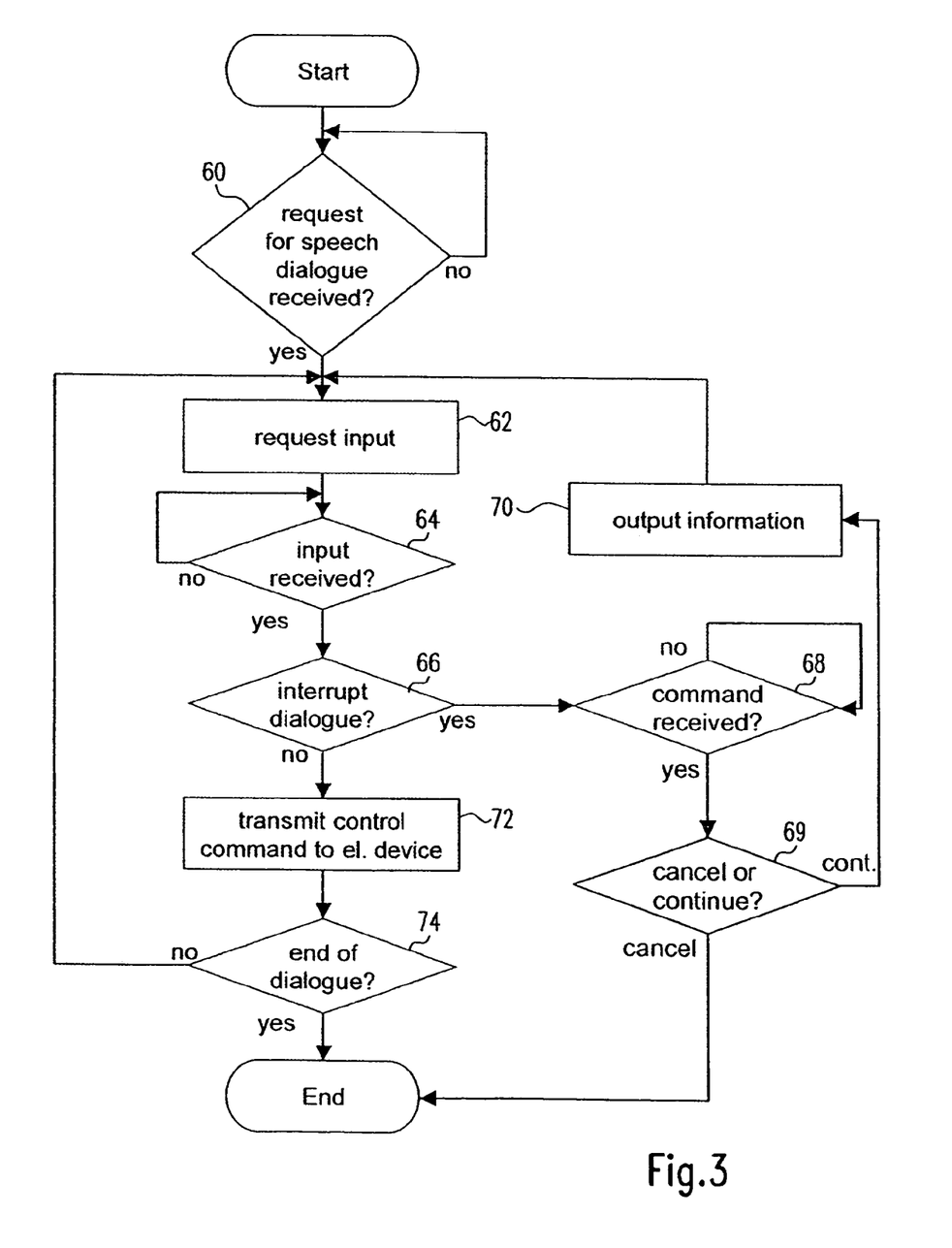
FIG. 3 is a flow diagram of an exemplary method for a speech dialogue system.

FIG. 3 illustrates a method for carrying out a speech dialogue between an SDS 18 and a user in order to control an electronic device 50. The process may be carried out by the SDS 18 of FIG. 2 or by the information and entertainment system as described in FIG. 1. Initially, the SDS 18 determines whether a request for a speech dialogue has been given by the user (step 60). To make a request, the user may activate the push to talk lever 48. Once the user has made a request, the SDS 18 requests a speech input from the user (step 62). The speech dialogue unit 42 may wait for a speech input or instruction from the user. In the meantime, the SDS 18 determines whether a speech input has been received (step 64) by the speech dialogue unit 42. When the speech input has been received, the SDS 18 checks whether the provided speech input corresponds to a pause command or contains a control command for controlling the electronic device 50 (step 66).

When the speech input does contain a pause command, the dialogue will be interrupted and the SDS 18 will pause at the last completed step for the electronic device 50. The pause command may take effect as soon as the command is given or a short time thereafter. The process may continue when a continue command is received (step 68). Again, the continue command may take effect as soon as the command is given or a short time thereafter. During the period of interruption of the dialogue, the multimedia screen 29 may display an identifier for the interrupted speech dialogue which may indicate the electronic device 50 that is targeted. During the interruption, it may be possible (not shown in FIG. 3) to start a second speech dialogue to control a different electronic device 50. The method for conducting the second speech dialogue would be identical to the method steps in FIG. 3.

The user may interrupt the speech dialogue for many reasons including the task of conducting the speech dialogue is too distracting because the user is driving a motor vehicle. For instance, traffic became dense and the driver must pay closer attention to the traffic. The user may give a speech command such as "pause" or activate a pause control key 52 on the speech dialogue system 18 to interrupt the dialogue. Continuing with the interrupted speech dialogue may be as simple as saying "continue" or activating a continuation control key 56 on the SDS 18.

However, during the speech dialogue, the user may not provide an interruption command. The on-going speech dialogue may be interrupted by a second electronic device 54 through the SDS 18. A second speech dialogue with the second electronic device 54 may be requested while the first speech dialogue remains interrupted. For example, the speech dialogue for communicating data for a target location into a navigation system may be interrupted by a telephone 11. During the telephone conversation, the user may need to store a new address or telephone number into his telephone. A request to the SDS 18 may be made and the second speech dialogue may take place for storing the address or phone number in the telephone 11, even though the first speech dialogue remains interrupted.

When a command has been received (step 68) during the speech dialogue interruption, the process determines (step 69) whether the command is a continuation command or a cancellation command. The speech analyzing unit 40 may analyze the signals received from the microphone 19 to filter out continuation and cancellation commands from the user. If the command is a cancellation command, the SDS 18 will end the interrupted speech dialogue. The SDS 18 may output a message informing the user that the dialogue has been cancelled.

When the continuation command is received (step 69), the SDS 18 outputs information regarding the interruption point of the speech dialogue (step 70). The continuation command may be an activation of the continuation key 56 (which may be combined with the PTT lever 48, as described above) or a speech command. The continuing command may be received from an electronic device 54 that may have interrupted the speech dialogue. The term "continuing" means that the speech dialogue is not restarted at the beginning. The previously provided speech from the user is still available to the user in the SDS 18 and may be stored in an internal storage means 58.

The continuation or continuing command may be include a repeating of part of the speech dialogue that was already communicated to the SDS 18 (step 70). The speech dialogue also may be continued exactly at the position where it was previously interrupted. By repeating a part of the speech dialogue, the user may receive information from the SDS 18 concerning the user inputs prior to the interruption (step 70). The SDS 18 may provide the information on a multimedia display 29 or through the speaker 31 (step 70).

The SDS 18 may otherwise provide the user with information concerning the speech dialogue to be continued when the user activates the continuation control key 56. For example, the SDS 18 may output, acoustically and/or visually, an identifier for the interrupted speech dialogue (step 70). The SDS 18 may repeat the last command received from the user which may have been carried out prior to the interruption. Alternatively, the SDS 18 may repeat all of the speech inputs received from the user and then repeat the last request from the SDS 18 (step 70). The SDS 18, after repeating all of the speech inputs may proceed to the next request (step 62). In a further example, the user may request from the SDS 18, the last commands or information that the user previously transmitted to the SDS 18.

The process may continue with the last request from the SDS 18. This is the last request for which information was not received from the user because of the interruption. Therefore, the SDS 18 may resume the speech dialogue by repeating the last request (step 62). The wording for the request from the SDS 18 may vary from the first time this information was requested to alert the user that this is a continued speech dialogue. The step for continuing with the speech dialogue may include notifying the user that the speech dialogue is about to begin (step 70). This notification can be through the speaker 31 or the multimedia screen 29.

When there is more than one speech dialogue that has been interrupted the step of continuing one of the interrupted speech dialogues (step 69) may include notifying the user of the continued speech dialogue, in particular, by identifying the electronic device 50 that will be controlled by the speech dialogue (step 70). The identification may be the announcement of the name of the electronic device 50 that will be controlled by the speech dialogue. The SDS 18 may display the name of the electronic devices 50 that are interrupted on a multimedia screen 29 (step 70). The SDS 18 may be connected to the screen 29 or the screen 29 may be an integral part of the SDS 18. During an interruption of the speech dialogue, the screen 29 may be used to keep the user informed of which speech dialogues are currently interrupted.

The process may continue with the wait cycle for the input (step 64) and when the information is received, the information will be screened for an interrupt command (step 66) once again. If the command received from the speech analyzer 40 is not an interrupt command, then the command received will be transmitted (step 72) to the electronic device 50 as a control command. This transmission may be directly to the electronic device 50 or through the head unit 17. The control command is then carried out by the electronic device 50. The SDS 18 will then check to see if there is any more information that is required or whether the end of the speech dialogue has been completed (step 74). If more information is required, then the SDS 18 will make a request of the user (step 62) for the next item of information that is needed to adequately control the electronic device 50. The speech dialogue process (steps 62 through 74) will continue until all of the information that is needed to control the electronic device 50 is acquired.

In the above description, the pause or interrupt command was a speech command. The pause command could have been indicated by a pause key 52. The use of the pause key 52 may allow the process to be interrupted at any time. As described previously, the speech dialogue also may be interrupted when a pause command is received by the interruption unit 44 from one of the electronic devices 54. The process also may continue when a continuation command is received at the continuation unit 46 from one of the electronic devices.

Figure 4:
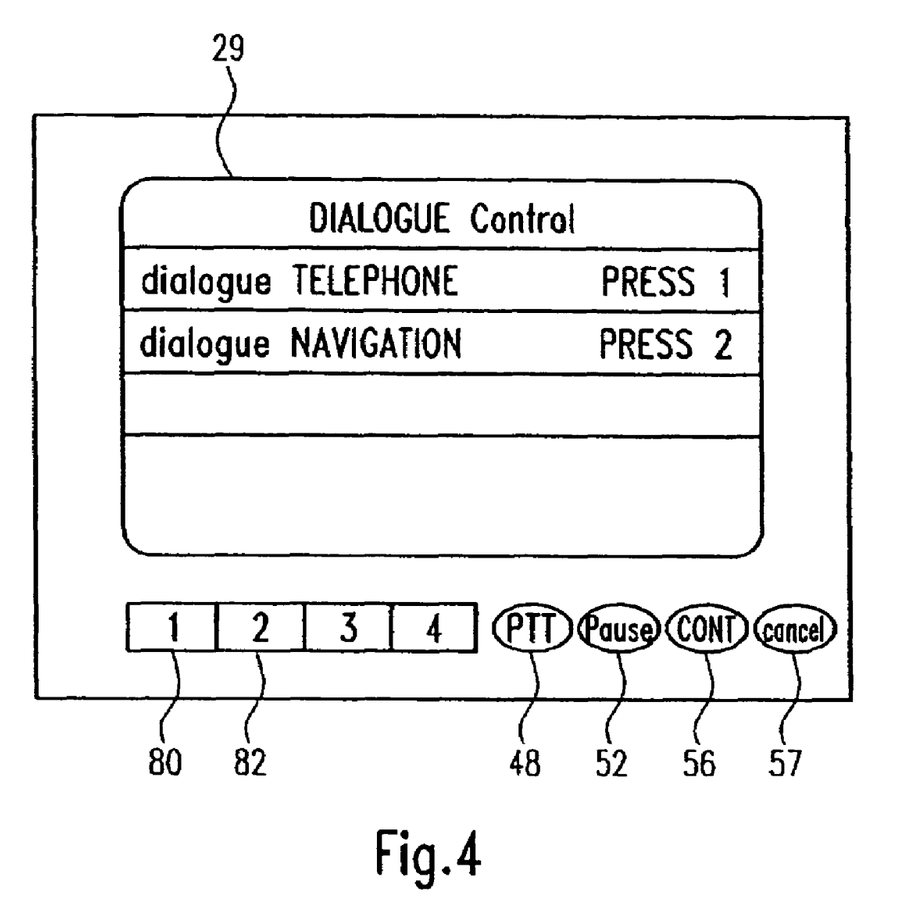
FIG. 4 is a multimedia display for a speech dialogue system.

FIG. 4 is an example of the information that may be displayed on the multimedia screen 29 during an interruption of a speech dialogue. In FIG. 4, the screen 29 displays two interrupted dialogues, one associated with a telephone call 83 and another concerning the navigation system 84. Each interrupted speech dialogue 83 and 84 may correspond to a control key 80 and 82 which are part of the control keys 27 (from FIG. 1). When the control key 80 is pressed, the interrupted speech dialogue associated with the telephone call may continue. When the control key 82 is pressed, the interrupted speech dialogue associated with the navigation system 7 may continue.

FIG. 4 shows a placement of the four control keys, the PTT key 48, the interrupt or pause key 52, the continue key 56, and the cancel key 57. These keys 48, 52, 56, and 57 were previously described with respect to the description of FIG. 2. The placement of these keys 48, 52, 56, and 57 may be on the housing for the multimedia screen 29 for the convenience of operation.

Upon implementing the speech dialogue, the SDS 18 may use pre-programmed queries that will be presented to the user. The speech dialogue may be present on the multimedia screen as well as by sound through the speaker 31. Example 1 presents a scenario of a speech dialogue that may take place while placing a telephone call.

EXAMPLE 1

|  | user (voice entry) | SDS (voice output) |
|---|---|---|
| 100 | telephone call | |
| 101 | | please provide number |
| 102 | 0173 | |
| 103 | | 0173 and then? |
| 104 | Pause | |
| 105 | | speech dialogue frozen |
| 106 | Continue | |
| 107 | | dial telephone number |
| 108 | | 0173 and then? |
| 109 | 3994 | |
| 110 | | 3994 |
| 111 | | the number 01733994 will be dialed |

Column 1 represents the speech input from the user and column 2 represents a programmed query from the SDS 18. After having input the area code (step 102) the user requests an interrupt to the dialogue (step 104) by saying "pause." Rather than saying "pause," the user may issue a haptic pause with the pause control key 56 or by a touch screen on the multimedia screen 29. The speech dialogue may continue after the user has provided the continuation command (step 106). After continuing, (step 107) the SDS 18 informs the user which speech dialogue was interrupted and repeats (step 108) the last input given by the user. The user may continue reciting the rest of the telephone number for the SDS 18. The SDS 18 repeats the number to be dialed (step 111) and may transmit the corresponding control commands, i.e. the telephone number to the telephone for dialing. In this particular speech dialogue, the SDS 18 repeats the speech input given from the user (steps 103 and 110).

EXAMPLE 2

|     | user (voice entry) | SDS (voice output) |
| --- | --- | --- |
| 200 | telephone call | |
| 201 | | please provide number |
| 202 | 0173 | |
| 203 | | 0173 and then? |
| 204 | pause | |
| 205 | | speech dialogue frozen |
| 206 | radio control | |
| 207 | | radio control on |
| 208 | volume down by two points | |
| 209 | | volume down by two points |
| 210 | continue and repeat last input | |
| 211 | | dial telephone number |
| 212 | | 0173 and then? |
| 213 | 3994 | |
| 214 | | 3994 |
| 215 | | the number 01733994 will be dialed |

In Example 2, steps 200-205 and steps 211-215 correspond to the first example and will not be explained in detail. The overall difference between the two examples is that the user starts a second speech dialogue while the first speech dialogue is interrupted. The user makes a request to carry out a speech dialogue with the radio (step 206). After the request for the second speech dialogue is granted, the user requests a change in volume (step 208). The radio carries out the command (step 209) and the second speech dialogue terminates. The user may request a continuation of the first interrupted speech dialogue associated with the telephone call (step 210). The user requests the SDS 18 to provide the necessary information so that the user knows where the first speech dialogue was interrupted. The SDS 18 responds with the function (step 211) and then repeats the last request (step 212) made by the SDS 18.

EXAMPLE 3

|     | user (voice entry) | SDS (voice output) | other electronic device (e.g. telephone) |
| --- | --- | --- | --- |
| 300 | radio control | | |
| 301 | | radio control on | |
| 302 | change radio station | | |
| 303 | | which radio station? | |
| 304 | | | incoming telephone call |
| 305 | | speech dialogue frozen | |
| 306 | | | telephone call terminated |
| 307 | | which radio station? | |
| 308 | FM 98.1 | | |
| 309 | | change radio station to FM 98.1 | |

In example 3, the user carries out a speech dialogue to change the radio station. The user requests radio control (step 300). Once the SDS 18 responds with an acknowledgement (step 301), the user states the command of "change radio station" (step 302). The SDS 18 requests the radio station (step 303) and the speech dialogue is interrupted by an incoming telephone call (step 304). Upon receiving the incoming telephone call the telephone sends a pause command to the SDS 18 which in turn interrupts the speech dialogue (step 305). As soon as the telephone call is terminated the telephone sends a continuation command to the SDS (step 306) and the speech dialogue continues (steps 307-309). An additional step may be added (step 305) where the SDS 18 informs the user that the speech dialogue will be interrupted due to the telephone call. During the interruption of the dialogue, the SDS 18 may transmit a control command to the radio interrupting the operation of the radio so that the telephone call will not be disturbed by the background noise of the radio. During the interruption of the dialogue, the SDS 18 may transmit a control command to the head unit that interrupts the operation of the head unit so that the telephone call will not be disturbed by the background noise or the operation of the head unit.

EXAMPLE 4

|     | user (voice entry) | SDS (voice output) | SDS (display) |
| --- | --- | --- | --- |
| 400 | new target location | | |
| 401 | | please spell the location | |
| 402 | U-L-M | | |
| 403 | | please choose one number from the display | |
| 404 | | | 1. Ulm<br>2. Ulmen<br>3. Ulmenhausen |
| 405 | pause | | |
| 406 | | | dialogue Navigation paused |
| 407 | continue | | |
| 408 | | please choose one number from the display | |
| 409 | | | 1. Ulm<br>2. Ulmen<br>3. Ulmenhausen |
| 410 | one | | |
| 411 | | new target location Ulm | |

Example 4 describes a speech dialogue between a user and a SDS 18 where the SDS 18 has a speaker 31 and a multimedia display 29 output. In this example, the user will input a new target destination into a navigation system 7. The user enters the first letters of the target location (step 402). In response, the SDS 18 announces that the navigation system 7 has found several locations comprising these letters (step 403) and the locations are displayed on the multimedia screen 29 connected to the SDS 18. The user may be informed that the locations may be selected by announcing the corresponding number that is displayed on the screen (step 404) with the location. However, the speech dialogue is then interrupted due to a corresponding spoken pause command from the user (step 405). During the interruption, the multimedia screen 29 may display the fact that the navigation speech dialogue has been interrupted (step 406). Following the continuation command (step 407) from the user, the SDS 18 repeats the last request for speech input (step 408) and the screen displays the same choices associated with the locations (step 409). The user then chooses one of these locations (step 410) and the new target location can be input into the navigation system (step 411).

In a variation of this example, the navigation system may generate the navigation information for each of the three possible locations during the interruption of the speech dialogue. When the speech dialogue is continued and the user makes a selection, the navigation system immediately proposes the corresponding navigation information for the destination which may speed up the application for the user.

A speech dialogue may be divided into several logical units. For example, the user may want to input a location into a navigation system. The SDS 18 may request logical units of the address requesting first, the city, and second, the street and street number. When continuing the speech dialogue after an interruption the speech dialogue may continue with one of the logical units depending on where the interruption occurred. If the street name has already been given, but not the number, the speech dialogue may continue by requesting the user to repeat the name of the street. By repeating a part of the speech dialogue, it is easier for the user to continue with the input as the user does not have to remember all of the details that were previously entered.

Although, the examples are described with reference to use in a vehicle, in particular a car, with an SDS 18 as described, the system is not restricted to cars but may be provide in any vehicle, such as a truck, bus, mobile home, or boat. Further, the system may be used in a home entertainment system that is especially conducive to receiving voice commands or other control systems in a home for controlling lights, environment, security systems and telephones.

The examples described above may be associated with an information and entertainment system, the SDS 18 and the method have been explained in the context of a vehicular environment. The SDS 18 and the method to carry out a speech dialogue between an SDS 18 and a user may be applied to dialogues between a user and a portable digital assistant (PDA) or in the context of computer-based dialogues via the telephone. In general, the speech dialogue could be applied for controlling the operation of any electronic device.

The SDS 18 may include a computer program product that includes one or more computer readable media that has computer executable instructions for performing the steps of the above method. In particular, the computer program product may provide instructions to the speech dialogue system for interrupting a speech dialogue between the user and the system and continuing the interrupted speech dialogue at the point where the dialogue was interrupted.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A speech dialogue system ("SDS") for carrying out a speech dialogue with a user comprising:
   a speech analyzing unit configured to receive a first speech dialogue and a second speech dialogue;
   a speech dialogue interruption unit for interrupting a first speech dialogue with the SDS, where the first speech dialogue is interrupted by the interruption unit when the speech analyzing unit receives a request for the second speech dialogue;
   a speech dialogue continuation unit for continuing the interrupted first speech dialogue by repeating a part of the first speech dialogue, where the speech dialogue continuation unit continues the interrupted first speech dialogue when the second speech dialogue is terminated; and
   an electronic device that is controlled by the first speech dialogue or the second speech dialogue.

2. The speech dialogue system of claim 1, where the speech dialogue continuing unit is configured to continue the speech dialogue at a position where the speech dialogue was interrupted.

3. The speech dialogue system of claim 1, where the speech dialogue continuation unit is configured to continue the speech dialogue by repeating a last part of the previously interrupted speech dialogue.

4. The speech dialogue system of claim 1, where the speech dialogue interruption unit and the speech dialogue continuation unit further comprise a control key.

5. The speech dialogue system of claim 1, where the speech dialogue interruption unit is configured to receive an acoustic control command.

6. The speech dialogue system of claim 1, where the speech dialogue continuation unit is configured to receive an acoustic control command.

7. The speech dialogue system of claim 1, where the speech dialogue interruption unit is configured for receiving a pause command that originates from the electronic device and the speech dialogue continuation device is configured for receiving a continuing command that originates from the electronic device.

8. The speech dialogue system of claim 1 further comprising a second electronic device, where the second speech dialogue controls the second electronic device.

9. The speech dialogue system of claim 1, further comprising a storage unit for storing speech inputs from the user, where the SDS is configured for outputting at least a part of the speech inputs when the speech dialogue continues.

10. The speech dialogue system of claim 1, where the SDS is configured to output a message when the speech dialogue continues informing the user that the interrupted speech dialogue is continuing.

11. The speech dialogue system of claim 1, where the SDS is configured to display an identifier of the interrupted speech dialogue and the electronic device associated with the interrupted speech dialogue.

12. The speech dialogue system of claim 1, further comprising an interrupted speech dialogue cancellation unit that includes a cancellation control key, where the cancellation unit is configured to cancel the speech dialogue upon receipt of an acoustic cancellation command.

13. An information and entertainment system comprising:
at least one electronic device; and
a speech dialogue system to control the at least one electronic device in accordance with a speech dialogue with a user, the speech dialogue system comprising:
a speech dialogue interruption unit that interrupts the speech dialogue upon receipt of a pause command,
a speech dialogue continuation unit that continues the interrupted speech dialogue upon reception of a continue command, where the continuation of the interrupted speech dialogue includes repeating a last input from the interrupted speech dialogue, and
an interrupted speech dialogue cancellation unit that cancels the interrupted speech dialogue upon reception of a cancellation command and outputs a message that the interrupted speech dialogue is cancelled.

14. The information and entertainment system of claim 13, where a head unit connected to the information and entertainment system is configured to interrupt operation while the speech dialogue is interrupted.

15. The information and entertainment system of claim 13, where the at least one electronic device is configured to interrupt operation while the speech dialogue is interrupted.

16. The information and entertainment system of claim 13, where a head unit connected to the information and entertainment system is configured to continue to operate when the speech dialogue is interrupted.

17. The information and entertainment system of claim 13, where the at least one electronic device is configured to continue operating when the speech dialogue is interrupted.

18. A method of conducting a speech dialogue between a speech dialogue system ("SDS") and a user, comprising:
receiving a request for a first speech dialogue;
initiating a first speech dialogue that controls a first electronic device;
interrupting the speech dialogue upon receipt of a predetermined pause command from the user or a second electronic device;
initiating a second speech dialogue upon receipt of the predetermined pause command, where the second speech dialogue controls the second electronic device;
continuing the first speech dialogue when the user or the another electronic device provides a predetermined continuation command to the SDS, where the predetermined continuation command is provided when the second speech dialogue is terminated;
canceling the speech dialogue when the user provides a predetermined cancellation command to the SDS; and
providing a notification of the cancellation.

19. The method of claim 18, further comprising: performing the first speech dialogue with the SDS by supplying requested information when prompted by the SDS.

20. The method of claim 18, where the step of continuing the first speech dialogue comprises repeating a part of the interrupted first speech dialogue.

21. The method of claim 18, where the step of continuing the first speech dialogue comprises displaying a part of the interrupted first speech dialogue.

22. The method of claim 18, where the step of continuing the first speech dialogue comprises indicating at least a last output from the SDS prior to interrupting the first speech dialogue.

23. The method of claim 18, where the step of continuing the first speech dialogue comprises indicating at least the last speech input received from the user prior to interrupting the first speech dialogue upon receipt of a corresponding command from the user.

24. The method of claim 18, where the step of continuing the first speech dialogue comprises waiting for a speech input from the user.

25. The method of claim 18, where the step of continuing the first speech dialogue comprises notifying the user that the interrupted speech dialogue is continuing.

26. The method of claim 18, where the steps of interrupting the first speech dialogue and/or continuing the first speech dialogue are initiated by the user through acoustic commands.

27. The method of claim 18, where the steps of interrupting the first speech dialogue and/or continuing the first speech dialogue are initiated by the user through haptic commands.

28. The method of claim 18, further comprising requesting the second speech dialogue for controlling the second electronic device after interrupting the first speech dialogue with the first electronic device.

29. The method of claim 28, further comprising the step of interrupting the first speech dialogue for controlling the second electronic device.

30. The method of claim 29, further comprising the step of continuing the first speech dialogue for controlling the second electronic device.

31. The method of claim 30, where continuing the first speech dialogue further comprises identifying the second electronic device associated with the continued speech dialogue to the user.

32. The method of claim 31, where identifying the second electronic device further comprises displaying a name of the second electronic device on a multimedia screen.

33. The method of claim 18, further comprising interrupting the operation of the first electronic device during the interrupting of the first speech dialogue.

34. The method of claim 18, further comprising transmitting a control command to the first electronic device during the interrupting of the first speech dialogue.

35. The method of claim 18, where the step of canceling further comprises notifying the user that the interrupted first speech dialogue is canceled.

36. The method of claim 18, where the predetermined cancellation command is an acoustic command or a haptic command.

37. The method of claim 18, where the step of interrupting further comprises interrupting the first speech dialogue upon receipt of the predetermined pause command from the second electronic device.

38. A speech dialogue system (SDS) for carrying out a speech dialogue with a user comprising:
a means for establishing a first speech dialogue that controls at least one electronic device;
a means for interrupting the first speech dialogue upon receipt of a pause command;
a means for establishing a second speech dialogue that controls a different electronic device when the pause command is received;
a means for terminating the second speech dialogue;
a means for continuing the interrupted first speech dialogue upon receipt of a continuation command when the second speech dialogue is terminated; and
a means for providing a part of the first speech dialogue upon receipt of the continuation command.

39. The speech dialogue system of claim 38, where the means for continuing the first speech dialogue is configured to continue the first speech dialogue at a position where the speech dialogue was interrupted.

40. The speech dialogue system of claim 38, where the means for providing a part of the first speech dialogue is configured to continue the first speech dialogue by repeating a part of the first speech dialogue.

41. The speech dialogue system of claim 38, where the means for interrupting the first speech dialogue and/or the means for continuing the first speech dialogue includes a control key.

42. The speech dialogue system of claim 38, where the means for interrupting the first speech dialogue is configured to interrupt the first speech dialogue upon receipt of an acoustic pause command, and the means for continuing the interrupted first speech dialogue is configured to continue the interrupted first speech dialogue upon receipt of an acoustic continuation command.

43. The speech dialogue system of claim 38, where the means for interrupting the first speech dialogue is configured to interrupt the first speech dialogue upon receipt of a pause command from an electronic device, and the means for continuing the first speech dialogue is configured to continue the interrupted first speech dialogue upon receipt of a continuation command from an electronic device.

44. The speech dialogue system of claim 38, further comprising a means for conducting the second speech dialogue for the different electronic device after the means for interrupting the first speech dialogue interrupts the first speech dialogue for the at least one electronic device and before the means for continuing the first speech dialogue receives a continuation command.

45. The speech dialogue system of claim 38, further comprising a means for storing speech inputs from a user, where the SDS is configured to output at least a part of the stored speech inputs when an interrupted speech dialogue is continued.

46. The speech dialogue system of claim 38, further comprising a means for displaying an identification of the interrupted speech dialogue and the electronic device associated with the interrupted speech dialogue.

47. The speech dialogue system claim 38, further comprising a means for canceling the interrupted speech dialogue where the means for canceling further comprises a control key and the means for canceling the interrupted speech dialogue is configured to cancel the speech dialogue upon receipt of an acoustic cancellation command.

48. A computer program product, comprising one or more computer readable storage medium having computer-executable instructions for:
- conducting a speech dialogue between a user and a speech dialogue system;
- interrupting the speech dialogue between the user and the system;
- providing a portion of the interrupted speech dialogue, where the portion comprises a recent input from the user;
- continuing the interrupted speech dialogue at the point where the speech dialogue was interrupted, where the point of interruption follows the recent input; and
- controlling, with the speech dialogue system, at least one electronic device based on the speech dialogue.

* * * * *